…

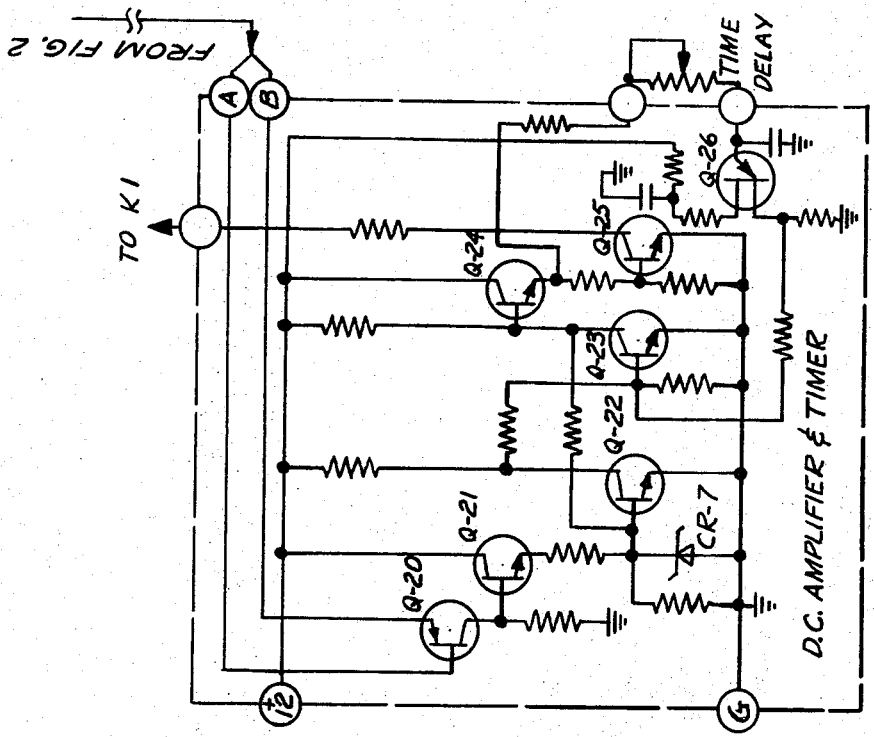
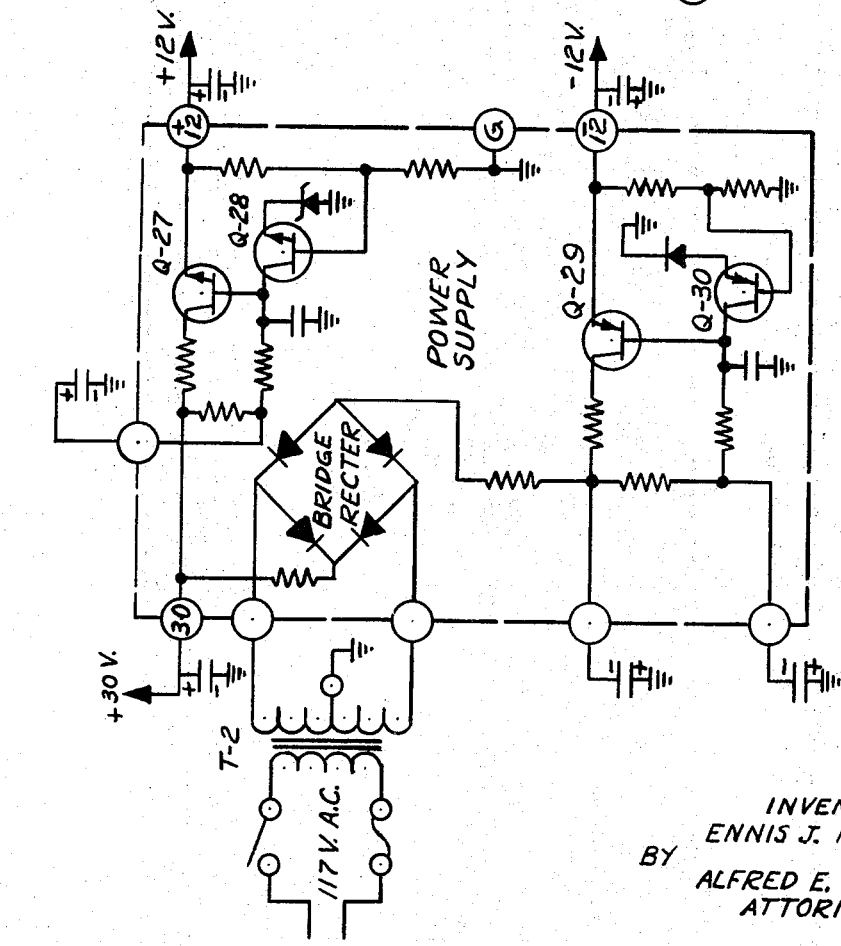
FIG. 3

United States Patent Office 3,533,927
Patented Oct. 13, 1970

3,533,927
SPARK ANTICIPATOR CIRCUIT FOR ELECTROCHEMICAL DEVICES
Ennis J. Manning, Lighthouse Point, Fla., assignor, by mesne assignments, to K M S Industries Incorporated, Ann Arbor, Mich., a corporation of Delaware
Filed Nov. 24, 1967, Ser. No. 685,485
Int. Cl. B23p 1/00
U.S. Cl. 204—143     9 Claims

ABSTRACT OF THE DISCLOSURE

A control circuit for anticipating a condition leading to a short-circuit between the tool and work in an electrochemical machining device by detecting the momentary drop in current at the electrodes and using this to actuate a delay in tool advance or power shut-off. A single input change in D.C. current is inverted to a change in voltage and used to detect a decreasing current and to operate a switching transistor to effect power shut-off to prevent damage to the tool or work.

---

This invention relates to an ultra-sensitive and ultra-fast control device capable of actuating control operations in a period of milliseconds when it detects a condition that could cause damage to the tool and/or work in an electrochemical machining device due to a short circuit. The nature of the electrochemical machining process is such that a gap of a few thousandths of an inch must be maintained constantly between the work, which is the anode, and the tool, which is the cathode. The electrolyte must flow freely through this gap. Thus the tool must be advanced at a rate that corresponds with the rate at which the metal is removed from the work so that the gap remains uniform.

The fault situation described occurs under conditions where direct observation is impossible due to the very small distance of the gap and the forced flow of electrolyte through it. It can occur through direct contact between the work and tool, or through bridging caused by a particle of foreign matter being stuck in the gap. When this condition occurs heating develops within a period of milliseconds and the tool and/or work can be damaged causing a considerable financial loss. Under these circumstances no warning is possible. It is necessary therefore to anticipate conditions leading to heating, and to effect the necessary preventive measures in the very brief period of time available.

My invention consists of a mechanism capable of accomplishing this result in the time required and under the operating conditions existing in electrochemical machining and similar processes. It was found that immediately before the surge of current that accompanies a short circuit there is a momentary current drop and this drop is used to trigger this response.

In the drawings wherein similar reference characters refer to similar parts in the various views of the drawings:

FIG. 3 is a diagrammatic view illustrating the fifth section or stage of the spark anticipator circuit together with the power supply circuit required to operate it.

Figure 1:
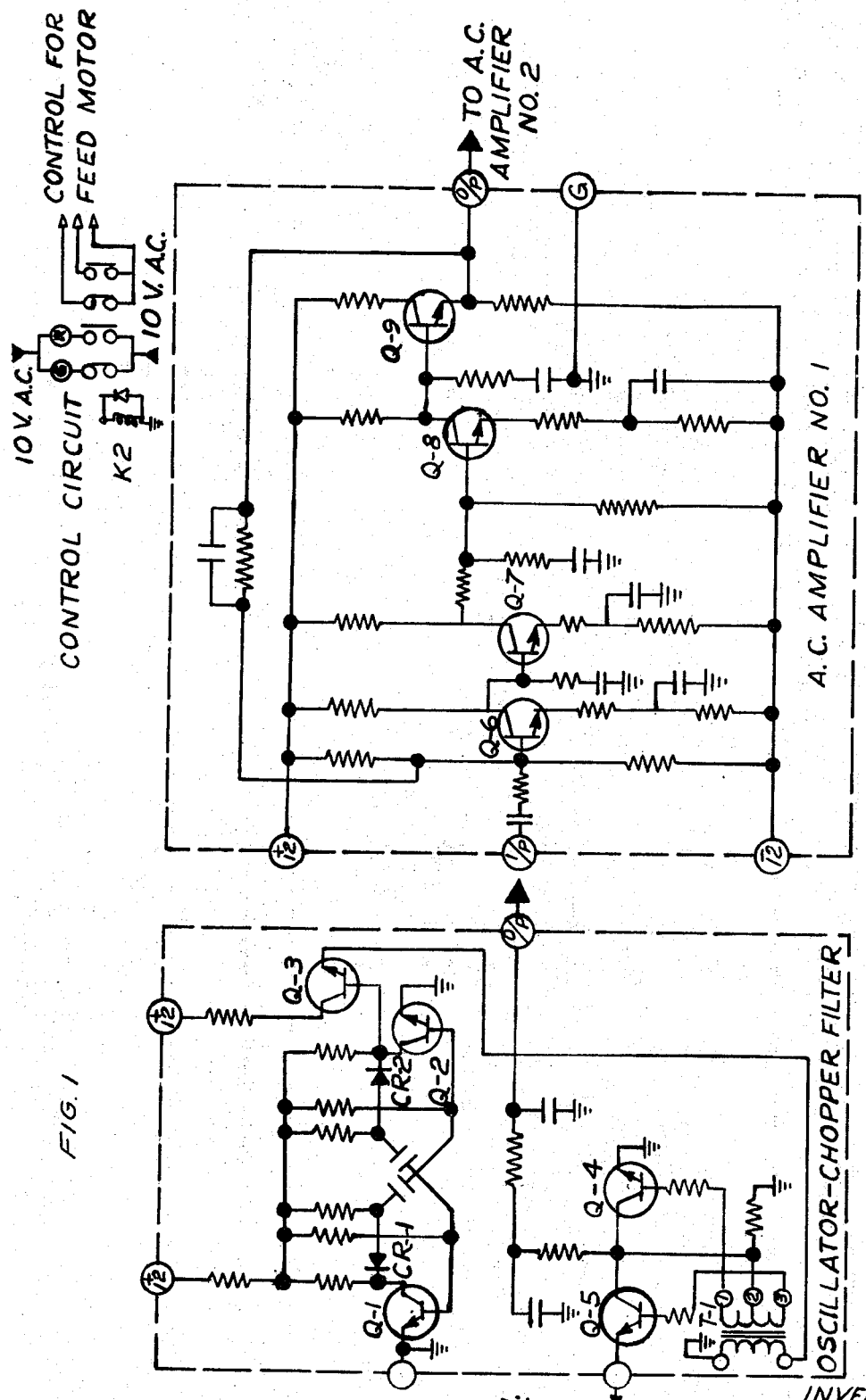
FIG. 1 is a diagrammatic view illustrating two sections of a spark anticipator circuit for an electrochemical device.
Figure 2:
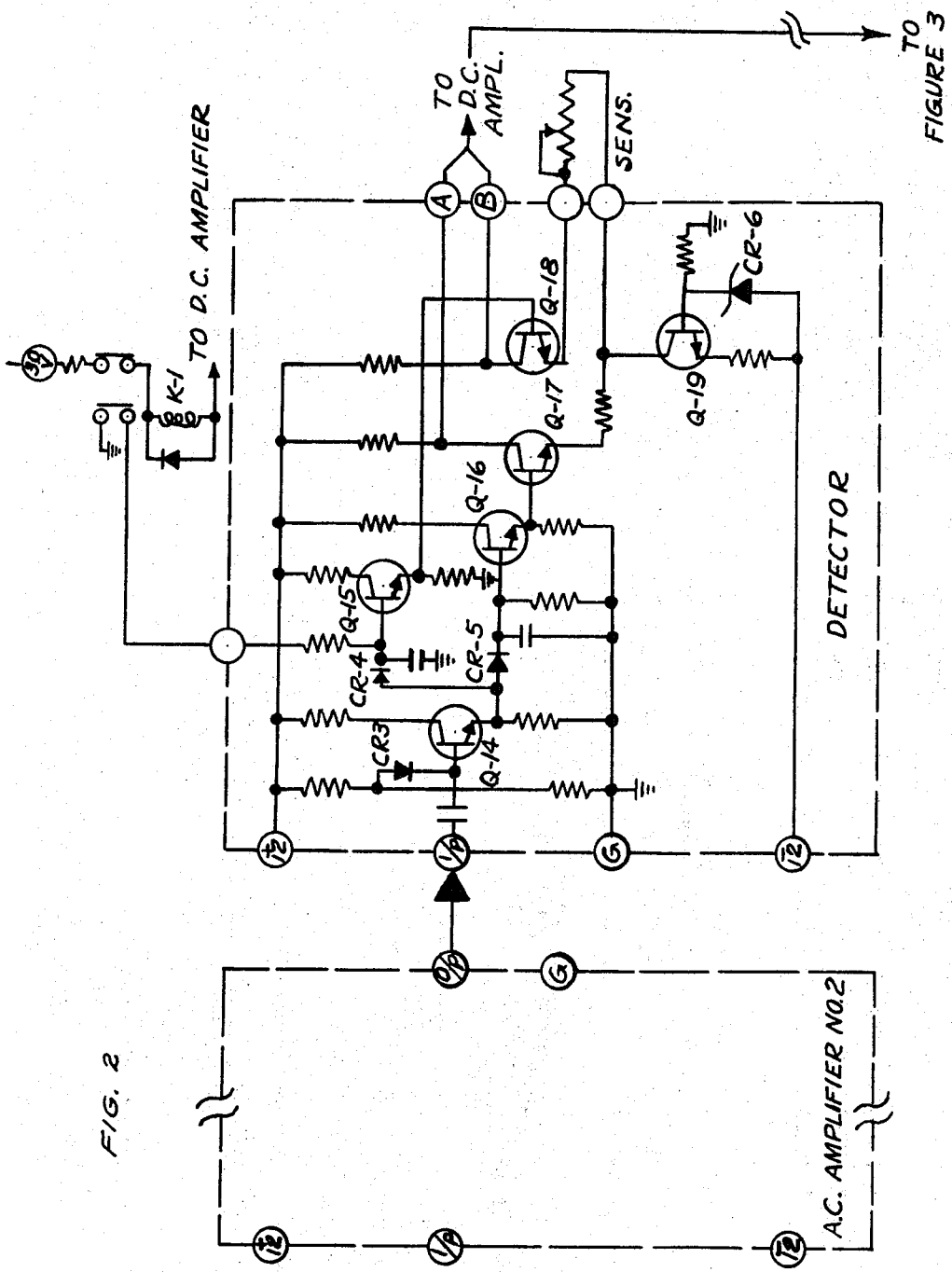
FIG. 2 is a view similar to FIG. 1 illustrating two additional sections or stages of a spark anticipator circuit for an electrochemical device.

Referring now to the drawing it will be noted that the input signal is taken from the ammeter shunt of the electrochemical machining device at which the observed momentary drop in current occurs. The circuit consists of five stages besides the power supply. Stage one performs the functions of an oscillator and filter, stages two and three are A.C. amplifiers, stage four contains the detector network, and stage five is the D.C. amplifier required for the control actuation. The transistors used in the circuit are numbered Q–1 to Q–26. The diodes are numbered from CR–1 to CR–7. This numbering is continued in the power supply except that the bridge rectifier is not separately numbered.

The first stage consists of two transistors, Q–1 and Q–2 in a free running multi-vibrator oscillator network which is coupled to the base transistor Q–3, which is coupled through a transformer T–1 to the two converter transistors Q–4 and Q–5. The filtered low level output is then coupled to the base of transistor Q–6 in the first stage of the A.C. amplifier.

Stage two, the first A.C. amplifier, consists of a transistor Q–6, the collector output from which is coupled to transistors Q–7 and Q–8 and to the emitter follower stage of transistor Q–9, which is then coupled to transistor Q–10 in the stage three second A.C. amplifier.

Stage three the second A.C. amplifier circuit is identical to that of stage two (the first A.C. amplifier) described above. The output from transistor Q–12 of this stage is capacitively coupled to the base of transistor Q–14 of the detector, stage four.

Stage four, the detector network, uses a diode CR–3 to cut off the negative excussion of the input wave as well as to provide bias voltage for transistor Q–14. The output of transistor Q–14 is diode coupled to the base of transistor Q–15 with a very long time constant as a memory device. The output of transistor Q–14 is also diode coupled to the base of transistor Q–16 with a short time constant. Transistors Q–15 and Q–16 are used as emitter-follower drivers for transistors Q–17 and Q–18 together with transistor Q–19 and a Zener diode in a differential amplifier configuration, while transistors Q–17 and Q–18 are coupled to the D.C. amplifier (stage five).

Referring to FIG. 3 it will be noted that stage five, the D.C. amplifier has transistor Q–20 coupled to switching transistor Q–21, which is coupled with a diode CR–7 to transistor Q–22, which is then coupled to transistor Q–23, which is coupled to transistor Q–24 which provides voltage for the timing capacitor in the time delay network. Transistor Q–25 is used to provide the power required to energize relay K–1 in the motor control network. Transistor Q–23 is also D.C. coupled to unijunction transistor Q–26 and its capacitor.

The power supply is from a line transformer secondary at 40 v. A.C. with a center tap to common. It is coupled to a full wave bridge rectifier and four transistors Q–27, Q–28, Q–29 and Q–30, to deliver series regulated positive 12 v. D.C. at 60 ma., and series regulated negative 12 v. D.C. at 30 ma.

The free running multi-vibrator oscillator circuit of transistor Q–1 and Q–2 is used to generate the audio frequency drive voltage of transistor Q–3, which is transformer coupled to converter transistors Q–4 and Q–5, the square wave output of which contains transients which are filtered out to provide filtered supply for the first stage A.C. amplifier. The square wave output of Q–4 and Q–5 changes amplitude with fluctuations of electrode current. The detector stage uses a diode CR–3 to cut off the negative excursion of the input wave so that the positive drives transistor Q–14. The diode CR–3 also provides the emitter base bias voltage for transistor Q–14. The emitter follower output is pulsated D.C. which is fed to transistors Q–15 and Q–16, which have long and short time constant filters respectively. Transistors Q–15 and Q–16 are emitter follower drivers for transistors Q–17 and Q–18, and respond alike to an increase in input thereby increasing the drive to transistors Q–17 and Q–18 in phase, and maintaining the same voltage difference between the output of transistors Q-17 and Q-18. Transistor Q-19 and the Zener diode provide variable degeneration in the emitter circuits of transistors Q-17 and Q-18, maintaining little, or no change in collector voltage level with increasing in drive. A decrease in input amplitude to transistor Q-14 thus results in decreasing the base voltage of transistor Q-16, but produces no change in the base voltage of transistor Q-15 due to the very long time constant delay at this point. Transistor Q-15 therefore maintains the same drive voltage to transistor Q-18, but the drive voltage for transistors Q-17 from Q-16 has decreased and a difference voltage is thus developed between the collector outputs of transistors Q-17 and Q-18. The base voltage of transistor Q-15 is then reset by discharging its base filter through the relay K-1 contacts. This small difference voltage becomes the input to the emitter base of the D.C. amplifier transistor Q-20, which is D.C. coupled to the switching transistor Q-21. In the bi-stable multi-vibrator comprising transistors Q-22 and Q-23, transistor Q-22 is normally cut off while Q-23 is normally full-on. The bistable multivibrator changes state when transistor Q-21 switches on. Emitter follower transistor Q-24 is then switched to full-on providing the voltage for the timing capacitor and also to switch on the relay drive transistor Q-25 thus energizing relay K-1.

The timing circuit of the unijunction transistor Q-26 and capacitor develops a positive pulse at the base of transistor Q-26 which is D.C. coupled to the base of transistor Q-23 of the bi-stable circuit, thus restoring transistor Q-23 to cut-off which thereby removes the timing voltage and so switches transistor Q-25 to cut-off and de-energizes relay K-1.

Diode CR-7 provides low impedance to the negative pulse required to switch transistor Q-23 to cut-off.

I claim:

1. In an electrochemical device wherein metal is removed by electrolysis in a process wherein a tool and a workpiece function as electrodes, and the tool is advanced relative to the workpiece at a rate corresponding with the rate of removal of metal from the workpiece to maintain a minute gap between the tool and the workpiece, a power supply for the electrodes and to advance the tool relative to the workpiece, the method of preventing damage to the tool or workpiece from short circuiting and the development of a fault current across the gap between the tool and the workpiece which comprises detecting the condition of a momentary drop in current at the electrodes prior to the development of a fault current to detect the imminence of a subsequent current surge as the fault current develops across the gap, and using this detected momentary drop in current at the electrodes to actuate an auxiliary control circuit to cut off the power supply.

2. In an electrochemical process wherein a tool and a workpiece function as electrodes and the tool is advanced relative to the workpiece to maintain a gap between the tool and the workpiece, a power supply, an auxiliary control circuit to shut off the power supply, the method of preventing damage to the tool or workpiece by heat resulting from short circuiting across the gap which comprises detecting the imminence of the impending short circuiting by detecting a reduction in current at the electrodes which is a condition that is symptomatic of an impending short circuit, converting the reduction of current to a difference in voltage signal, and amplifying the converted signal from this symptomatic condition to actuate the auxiliary control circuit to shut off the power supply.

3. In an electrochemical process wherein a tool and a workpiece function as electrodes and the tool is advanced relative to the workpiece to maintain a gap between the tool and the workpiece, a power supply, an auxiliary control circuit to shut off the power supply, the method of preventing damage to the tool or workpiece by heat resulting from short circuiting across the gap which comprises detecting the imminence of the impending short circuit by detecting a momentary drop in power at the electrodes that precedes the development of a fault current, and converting the detected drop in power by the control circuit into a differential voltage which is capable of actuating a protective response, the circuit embodying a network with a transistor and Zener diode as a current regulating stage of the differential voltage amplifier part of the circuit.

4. In an electrochemical device wherein a tool and a workpiece function as electrodes and the tool is advanced relative to the workpiece to maintain a gap between the tool and the workpiece, a power supply, an auxiliary control circuit to shut off the power supply to prevent damage to the tool or workpiece by heat resulting from shorting across the gap, said control circuit comprising:
 (a) detector means connected to said power supply for detecting a momentary decrease in the current which is symptomatic of an impending short circuit, and
 (b) differential amplifier means receiving the output of said detector means and generating a difference voltage signal in response to the detected momentary decrease which is sufficient to actuate the control circuit to cut off the power supply.

5. A control circuit as recited in claim 4, further comprising oscillator means connected between said power supply and said detector and producing an AC output voltage modulated by a change in the current in said power supply, said detector means being responsive to said modulated AC voltage.

6. A control circuit as recited in claim 5, further comprising AC amplifying means connected between said oscillator means and said detector means for amplifying said modulated AC voltage.

7. A control circuit as recited in claim 5, wherein said detector means comprises:
 (a) cut-off means for receiving the modulated AC voltage and producing a half-wave rectification of said AC modulated voltage,
 (b) a short time constant circuit means connected to said cutoff means for producing a filtered output of said half-rectified voltage, and
 (c) a long time constant circuit means connected to said cut-off means for producing a filtered output of said half-wave rectified voltage, said differential amplifier means receiving the outputs from said short time constant circuit means and said long time circuit means.

8. A control circuit as recited in claim 7, wherein said differential amplifier means includes a network having a transistor and a Zener diode as a current regulating stage for said differential amplifier means.

9. A control circuit as recited in claim 5, further comprising DC amplifier means, connected to the output of said differential amplifier means for amplifying said difference voltage signal.

References Cited

UNITED STATES PATENTS

| 3,401,102 | 9/1968 | Stiff | 204—228 |
| 3,328,279 | 6/1967 | Williams et al. | 204—228 |
| 3,301,776 | 1/1967 | Hughes | 204—228 |
| 3,202,599 | 8/1965 | Schierholt | 204—228 |
| 2,826,540 | 3/1958 | Keelfric | 204—228 |

JOHN H. MACK, Primary Examiner

S. S. KANTER, Assistant Examiner

U.S. Cl. X.R.

204—224

Notice of Adverse Decision in Interference

In Interference No. 98,423 involving Patent No. 3,533,927, E. J. Manning, SPARK ANTICIPATOR CIRCUIT FOR ELECTROCHEMICAL DEVICES, final judgment adverse to the patentee was rendered Oct. 18, 1974, as to claims 1, 2, 4, 5 and 9.

[*Official Gazette February 18, 1975.*]